Figure 1:
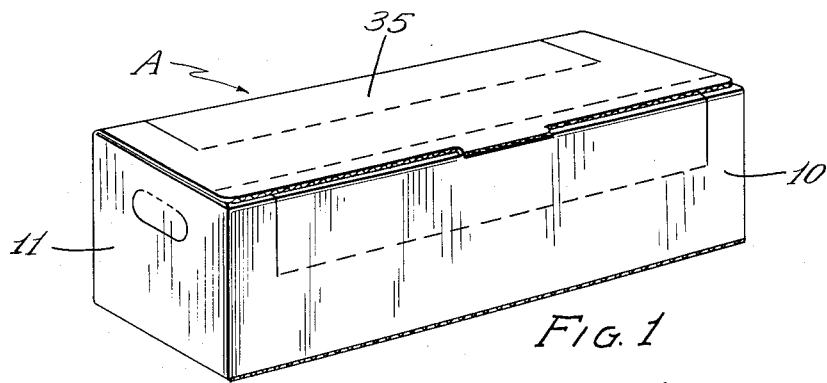

Dec. 26, 1961 T. G. MAIRS ET AL 3,014,635
FROZEN POULTRY BOXES
Filed Feb. 15, 1960 2 Sheets-Sheet 1

INVENTORS
Thomas G. Mairs
Henry R. Russell
Frank W. Locke
BY Robert N. Dunning ATTORNEY Dec. 26, 1961   T. G. MAIRS ET AL   3,014,635
FROZEN POULTRY BOXES
Filed Feb. 15, 1960   2 Sheets-Sheet 2

INVENTORS
Thomas G. Mairs
Henry R. Russell
Frank W. Locke
BY Robert M. Dunning
ATTORNEY

United States Patent Office 3,014,635
Patented Dec. 26, 1961

3,014,635
FROZEN POULTRY BOXES
Thomas G. Mairs and Henry R. Russell, St. Paul, and Frank W. Locke, Minneapolis, Minn., assignors to Waldorf Paper Products Company, St. Paul, Minn., a corporation of Minnesota
Filed Feb. 15, 1960, Ser. No. 8,791
5 Claims. (Cl. 229—38)

This invention relates to an improvement in frozen poultry boxes and deals particularly with a container designed to contain poultry such as turkeys and the like, which may be stacked one above the other, and which is provided, in one position, with partially opened side walls so that cold air may be readily circulated through the container during storage.

Containers of corrugated paperboard are often times used for the shipment of turkeys in a frozen state. In order to simplify the packaging problem, it is common practice to place the poultry in the container while in an unfrozen state and then to place the containers in a freezing chamber to quickly freeze the poultry. In view of the fact that corrugated paperboard is a relatively good heat insulator, considerable time is often spent in freezing the poultry if the containers are closed during the freezing operation. As a result, the containers must remain open in some manner during this process and later closed for transportation purposes.

In the past it has been common practice to pack the poultry in a two part telescoped container with the two parts of the container nested together to provide an open top. However, in such an arrangement, the smaller portion of the container must be lifted from the larger cover portion of the container, the larger portion being then inverted and telescoped onto the smaller part to close the container. It is an object of the present invention to provide a container which may be readily closed after the product has been frozen.

A feature of the present invention resides in the provision of a one piece container having hingedly connected side and end walls. Handles are hingedly secured to the bottom portion of the walls to form a container bottom. Panels are connected to the upper edges of the side walls to form top closure panels. Portions of the side walls and adjoining portions of the top panels are arranged to fold into face contact when the cover panels of the side walls are folded down along side of the side walls to which they are hinged. These foldable portions provide openings in the side walls through which cold air may be circulated during the freezing operation.

A further feature of the present invention resides in the provision of relatively short top panels hingedly connected to the upper edges of the end walls and end wall liner panels foldably connected to the free edge of these short top panels and which may be folded down into the container so that the end of the liner panels converge to the juncture between the bottom panels and the end wall panels. This provides a hollow triangular area at each end of the container which is wider at the top and tapers to nothing at the bottom of the container. The short top panel thus firmly supported and provide ledges upon which another similar container may be placed. As a result, the containers may be stacked one upon the other while the cover panels of the side walls are folded outwardly and downwardly to provide openings of considerable size through which cold air may be circulated in order to freeze the poultry.

These and other objects and novel features of the present invention will be more clearly and fully set forth in the following specification and claims:

In the drawings forming a part of the specification:
FIGURE 1 is a perspective view of the poultry container in closed position.

Figure 2:
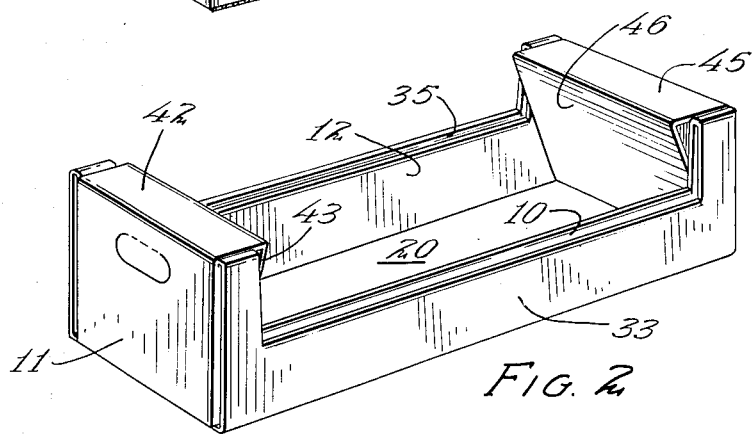
Figure 3:
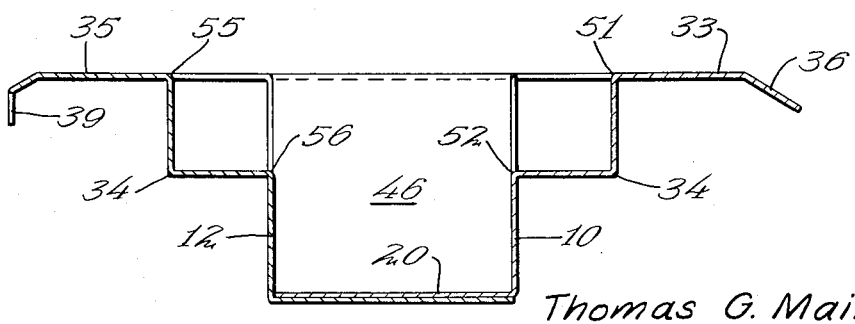
Figures 4, 5:
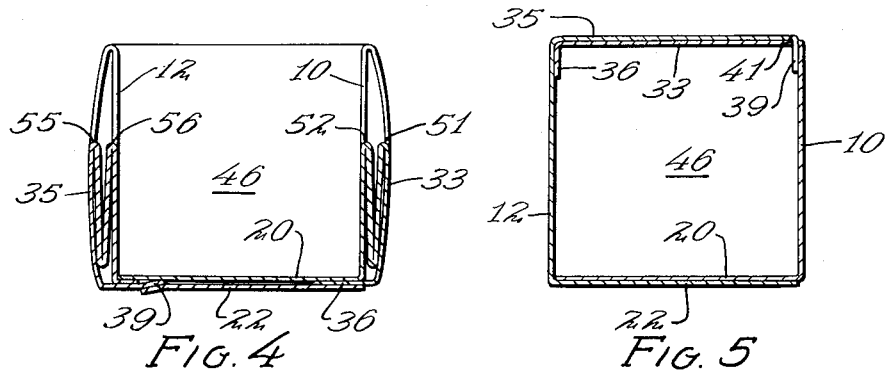
Figure 6:
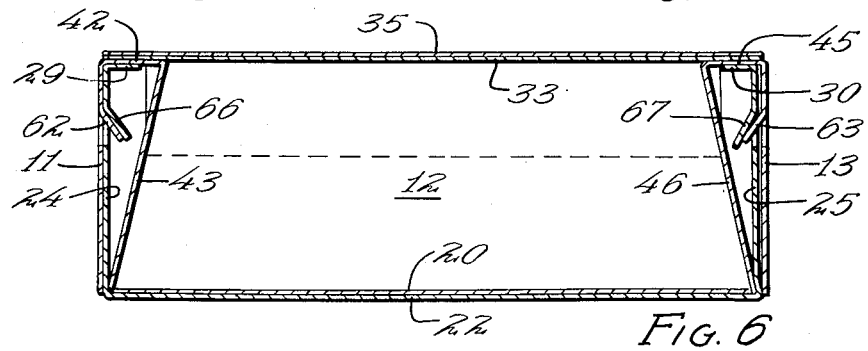
Figure 7:
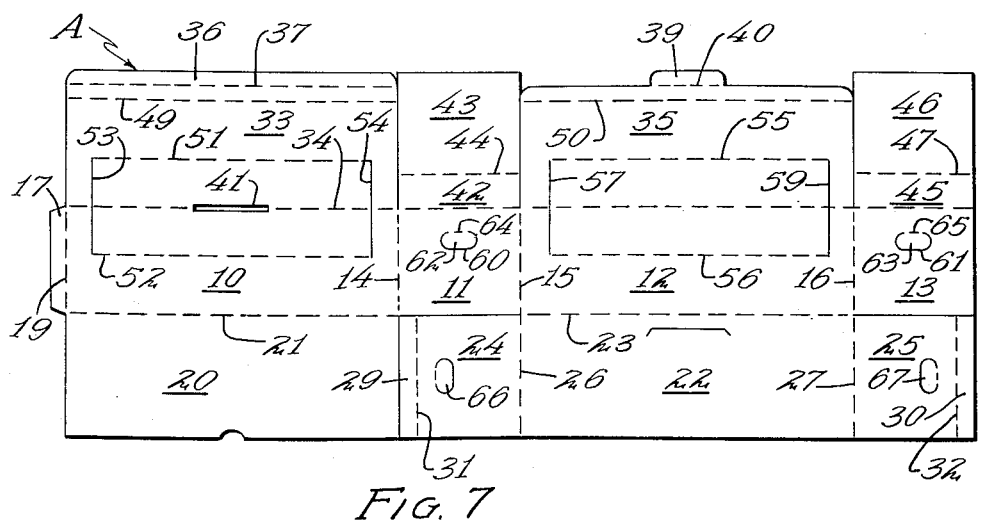

FIGURE 2 is a perspective view of the poultry container in open position.
FIGURE 3 is a transverse cross sectional view through the container in partially open position.
FIGURE 4 is a transverse cross sectional view through the container in open position.
FIGURE 5 is a transverse cross sectional view through the container in fully closed position.
FIGURE 6 is a longitudinal section on a vertical plane through the center of the container.
FIGURE 7 is a diagrammatic view of the blank from which the container is formed.

The poultry container A is formed as is best illustrated in FIGURE 7 of the drawings. The blank includes a side wall panel 10, an end wall panel 11, a second side wall panel 12 and an end wall panel 13 which are hingedly connected together along parallel fold lines 14, 15 and 16. An anchoring flap 17 is secured to a side wall panel 10 along a fold line 19.

The lower edge of the side wall panel 10 is foldably connected to a bottom panel 20 along fold line 21. A bottom panel 22 is foldably connected to the lower edge of the side wall panel 12 along a fold line 23. End wall liner panels 24 and 25 are foldably connected to the ends of the bottom panel 22 along parallel fold lines 26 and 27. Flaps 29 and 30 are foldably connected to the end wall liner panels 24 and 25 along parallel fold lines 31 and 32 which are parallel to the fold lines 26 and 27. A top panel 33 is foldably connected to the side wall panel 10 along a fold line 34. A top panel 35 is foldably connected to the side wall 12 along an extension of the fold line 34. A tuck flap 36 is foldably connected to the top panel 33 along a fold line 37 which is parallel to the fold line 34. A locking tab 39 is foldably connected to the edge of the top panel 35 along a fold line 40. A slot 41 is formed at the edge of the top panel 33 foldably connected to the side wall panel 10 along the fold line 34, and slot 41 is of proper size, and is properly spaced to accommodate the locking flap 39 in the closed condition of the container. A top panel 42 is foldably connected to the end wall panel 11 along the fold line 34 and a reinforcing panel 43 is foldably connected to the top panel 42 along a fold line 44. A top panel 45 is foldably connected to the end wall panel 13 along the fold line 34 and a reinforcing panel 46 is foldably connected to the end of the top panel 45 along a fold line 47. The top panel 42 and its reinforcing panel 43, as well as the top panel 45 and its reinforcing panel 46 are properly proportioned to form a right triangle with the reinforcing panels 43 and 46 respectfully forming the hypotenuse of each triangle.

A fold line 49 extends transversely across the top panel 33 parallel to the fold line 34 and spaced therefrom a distance approximately equal to the height of the side wall 10. Similarly, a fold line 50 extends across the top panel 35 parallel to the fold line 34 and spaced therefrom a distance equal to or slightly greater than the height of the side wall panel 12. The fold lines 49 and 50 permit the top panels 33 and 35 to be folded down outwardly of the sidewall panels 10 and 12 when the portions of the top panels beyond the fold lines 49 and 50 are folded beneath the container.

Fold lines 51 and 52 extend transversely across the center portions of the top panel 33 and side wall panel 10 in parallel relation to the fold line 34 and equally spaced from the fold line 34. Cut lines 53 and 54 connect the ends of the fold lines 51 and 52. In a similar manner, fold lines 55 and 56 extend transversely across the center portion of the top panel 35 and the side wall panel 12 on opposite sides of the fold line 34 and equally spaced therefrom. Cut lines 57 and 59 connect the ends of the fold lines 55 and 56. The cut lines 53, 54, 57 and 59 are parallel to the fold lines connecting the side wall and end wall panels and are spaced from the ends of the panels a substantially equal distance.

Generally U-shaped cut lines 60 and 61 are provided in the end walls 11 and 13 defining hand holes which are normally closed by flaps 62 and 63 which are foldably connected to the end walls along fold lines 64 and 65. Hand holes 66 and 67 are also provided in the end wall liner panels 24 and 25 which are folded into registry with the hand holes 60 and 61 when the container is set up.

In setting up the container, the flap 17 is folded into overlapping relation with the panel 13 and the side and end walls are connected in tubular formation. The bottom panel 20 is folded along the fold line 21 in face contact with the side wall 10 to which it is hinged. The end wall liner panels 24 and 25 with their connected flaps 29 and 30 are folded into face contact with the bottom panel 22, and this panel together with the end wall liner flaps is folded along the fold line 23 until it is in bottom closing position. The end wall liner flaps 24 and 25 are then folded upwardly along their fold lines 26 and 27 until these panels 24 and 25 lie inwardly of, and are in face contact with, the end wall panels 11 and 13. The bottom panel 20 is then folded down to overlie the panel 22.

The flaps or flanges 29 and 30 on the end wall liner panels 24 and 25 are folded down into a substantially common plane. The top closure flaps 42 and 45 are then folded down to extend inwardly from the end walls and at substantially right angles thereto. During this operation, the end flap extensions 43 and 46 are folded downwardly and into converging relation with the end walls, the end edges of the flap extensions abutting the ends of the bottom panel 20 at the juncture between the bottom closure and the end walls. In other words, the ends of the flap extensions 43 and 44 abut the bottom panel 20 adjoining the fold lines 26 and 27 connecting the bottom panel 22 to the end wall liner flaps 24 and 25.

It will be understood that the bottom can, if desired, be closed by bottom closure flaps hingedly connected to the lower edges of both the side walls and the end walls. The type of bottom structure illustrated is preferred because this structure provides greater reinforcement for the end walls and provides greater stacking strength for the container.

When the container has been filled with poultry or other products to be frozen, the top panels 33 and 35 are folded outwardly along the portions of the fold line 34 lying between the cut lines intersecting this fold line and the ends of the side wall top closure flaps. Simultaneously, the portions of the side walls and side wall top closure flaps which are between the spaced cut lines are folded along the parallel fold lines in the manner illustrated in FIGURE 3 of the drawings. In other words, the portions of the container between the fold lines 51 and 52 are folded into surface contact and the portions of the container between the fold lines 55 and 56 are also folded into surface contact, thus providing side walls of reduced height. The portions of the side wall closure flaps outwardly of the fold lines 49 and 50 are folded beneath the bottom closure as indicated in FIGURE 4 of the drawings.

When thus arranged, the containers may be stacked one upon the other and at the same time cold air may be circulated through the containers to quickly freeze the poultry. At the completion of the freezing process, the top wall closure panels may be folded into container closing condition illustrated in FIGURES 1 and 6. This is accomplished by folding the top closure flap 33 into position overlying the product, and tucking the tuck flap 36 down inwardly of the upper edge of the side wall 12. The cover flap 35 is next folded to overlie the panel 33 and the locking flap 39 is tucked through the slot 41 to complete the closure.

In accordance with the patent statutes, we have described the principles of construction and operation of our improvement in frozen poultry boxes, and while we have endeavored to set forth the best embodiment thereof, we desire to have it understood that changes may be made within the scope of the following claims without departing from the spirit of our invention.

We claim:

1. A container including hingedly connected side and end walls, a bottom closure connected to the lower edge of at least certain of said walls, top closure flaps hingedly connected to the upper edges of said side and end walls, fold lines in said side walls and in the top closure flaps thereon extending parallel to the hinge lines connecting said side walls to said top closure flaps and equally spaced from said hinge lines and on opposite sides thereof, said fold lines terminating short of the ends of said side walls and connected flaps, and cut lines connecting the ends of the fold lines in said side walls to the corresponding ends of the fold lines in the connected flaps, whereupon when said top closure flaps are folded outwardly of the side walls to which they are hinged, the portions of the side wall and top closure flaps between said cut lines may be folded into face contact along said fold lines.

2. The structure of claim 1 and including portions on the ends of said top closure flaps foldable beneath said bottom closure when said top closure flaps are folded against said side walls.

3. The structure of claim 1 and in which said top closure flaps hingedly connected to said end walls include end extensions foldable into engagement with said bottom closure at the juncture of said bottom closure with said end walls.

4. A container including rectangularly arranged side and end walls connected in tubular relation, a bottom closure connected to the lower ends of at least certain of said walls, top closure flaps connected to said end walls and foldable into substantially right angular relation thereto, flap extensions connected to the ends of said top closure flaps and foldable into converging relation to the end walls to which they are connected and terminating adjacent the junctions between said end walls and said bottom closure, and top closure flaps hingedly connected to said side wall and foldable to overlie said first mentioned top closure flaps, said end walls, top closure flaps connected thereto and flap extensions forming a generally wedge-shaped compartment inwardly of each end wall and said end walls including hand holes therethrough somewhat below the upper edges thereof.

5. A container including rectangularly arranged side and end walls connected in tubular relation, a bottom closure connected to the lower ends of at least certain of said walls, top closure flaps connected to said end walls and foldable into substantially right angular relation thereto, flap extensions connected to the ends of said top closure flaps and foldable into converging relation to the end walls to which they are connected and terminating adjacent the junctions between said end walls and said bottom closure, and top closure flaps hingedly connected to said side wall and foldable to overlie said first mentioned top closure flaps, said bottom closure flaps being hingedly secured to said side walls and one of said bottom closure flaps including end walls liner panels hingedly connected thereto and lying inwardly of said end walls in face contact thereto said end wall liner panels, top closure flaps connected to said end walls, and said flap extensions forming generally wedge-shaped compartments inwardly of said end walls, and said end walls and liner panel having registering hand holes therethrough near the upper edges thereof.

References Cited in the file of this patent

UNITED STATES PATENTS

| | | |
|---|---|---|
| 2,414,703 | Snyder | Jan. 21, 1947 |
| 2,418,963 | Anderson | Apr. 15, 1947 |
| 2,645,353 | Anderson | July 14, 1953 |